United States Patent [19]

Bonnebat et al.

[11] 4,340,721

[45] Jul. 20, 1982

[54] NOVEL POLYESTER FOR THE PACKAGING OF COMESTIBLES

[75] Inventors: Claude Bonnebat, Pontault Combault; Gilbert Roullet, Clamecy; Yves Vaginay, Corbas, all of France

[73] Assignee: Rhone-Poulenc Industries, Paris, France

[21] Appl. No.: 265,335

[22] Filed: May 19, 1981

[30] Foreign Application Priority Data

May 20, 1980 [FR] France ................................ 80 11201

[51] Int. Cl.³ ............................................. C08G 63/02
[52] U.S. Cl. .................................. 528/272; 528/274; 528/285; 528/302
[58] Field of Search ............... 528/272, 274, 285, 302

[56] References Cited

U.S. PATENT DOCUMENTS

| | | | |
|---|---|---|---|
| 4,049,631 | 9/1977 | Go | 528/285 X |
| 4,154,920 | 5/1979 | Jabarin | 528/272 |
| 4,225,549 | 9/1980 | Allan | 528/272 X |
| 4,230,819 | 10/1980 | Hauenstein et al. | 528/272 X |
| 4,256,860 | 3/1981 | Davis et al. | 528/302 X |

*Primary Examiner*—Lucille M. Phynes
*Attorney, Agent, or Firm*—Burns, Doane, Swecker & Mathis

[57] ABSTRACT

Novel polyester for the packaging of perishable comestibles, e.g., as bottles for still or carbonated mineral waters, is a poly(ethylene glycol)terephthalate (PET) having an intrinsic viscosity ranging from 0.65 to 1.05 dl/g and a density of more than 1.38, comprising 92.5 to 98.5% of ethylene terephthalate recurring units and 1.5 to 7.5 mol % of recurring units of at least one polybasic acid and/or polyhydric alcohol comonomeric crystallization retardant, the di- and/or triethylene glycol content thereof being less than about 3.5 mol % per mol of diacid radicals present in the polymer chain, said PET also having a residual acetaldehyde concentration of less than 1.25 ppm, with acetaldehyde being reformed therefrom at a rate of less than 5 ppm/hour, at 220° C., and said PET being devoid of visible crystallization in an at least 4 mm thick test plate shaped in a mold cavity from a melt thereof.

15 Claims, No Drawings

NOVEL POLYESTER FOR THE PACKAGING OF COMESTIBLES

BACKGROUND OF THE INVENTION

1. Field of the Invention

The present invention relates to improved saturated polyesters comprising ethylene glycol terephthalate recurring units, and to containers shaped therefrom useful for the packaging of foodstuffs and beverages. The invention also relates to a process for the preparation of such improved polyesters.

2. Description of the Prior Art

It is well known to this art that thermoplastic polyesters comprising ethylene glycol terephthalate regularly recurring units constitute valuable starting materials for the packaging of food products, in the form of films, sheets and containers, and especially in the form of bottles intended for storing quiescent or still liquids or carbonated beverages.

One of the essential properties which such packaging, and more particularly a bottle, must possess, is transparency and brightness. By drawing from the amorphous state under conditions of biaxial orientation, poly(ethylene glycol)terephthalate retains good transparency while at the same time displays the advantage of an oriented crystalline phase which considerably enhances its mechanical properties and permits a reduction in the permeability to gases. However, the transparency and the brightness can be adversely affected by the formation of crystalline spherulites, especially in the case of containers with relatively thick walls. The production of bottles by injection molding and/or extrusion-blowing, or blow molding, necessarily involves the prior production of a preform having thick walls, which is obtained by quenching from the molten state, and the formation of crystalline spherulites at the preform stage adversely affects the transparency of the finished article. It has thus proved advantageous to recommend grades of polyester having a slow rate of crystallization.

Another property which packaging material fabricated from a polymeric substance must possess is the absence of any compound or additive which is capable of migrating into the food product or the drink and of impairing its taste or its smell. It too is known, though, that polyester resins release acetaldehyde by degradation, and this possesses a strong smell and a characteristic taste which appear at extremely low concentrations.

The aforesaid problem is particularly significant and acute in the packaging (bottling) of mineral water. Thus, polyester bottles intended for aerated mineral water must have an acetaldehyde concentration of less than 5 ppm (parts per million of polyester by weight/weight) in the wall members thereof, for a volume of between 1 liter and 2 liters, if it is desired to ensure that, under storage conditions, at temperatures which can reach 45° C., the amount of acetaldehyde which is capable of migrating into the liquid remains less than the detectable organoleptic threshold, that is to say 40–50 ppb (parts per billion by weight/weight of liquid). The amount of acetaldehyde present in the finished shaped articles depends both on the residual amount present in the polyester granules, before they are converted, and on the amount formed during the conversion in the molten state, as a result of degradation under the conditions of shear and temperature which are required for molding.

Various processes have to date been proposed for reducing the concentration and/or the reformation of acetaldehyde in poly(ethylene glycol)terephthalate resins. Typically, such processes feature operating conditions, during the stages of drying, crystallization or post-condensation of the precursor low molecular weight prepolymer, which are of the kind commonly used in the manufacture of high-viscosity resins.

Thus, according to published French Patent Application No. 78/23,635, for example, the drying of the polyester chips is carried out at 180°–230° C. for 4 to 12 hours, in an inert atmosphere, in order to reduce the acetaldehyde concentration in the chips to less than 2.5 ppm. According to published French Patent Application No. 79/10,061, a reduction in the rate of formation of acetaldehyde is achieved by treating the completely polymerized polyester in molten state, under an inert atmosphere.

And according to published French Patent Application No. 79/11,981, the polymer is crystallized by heating to 180°–220° C., and the post-condensation is carried out at a temperature above the crystallization temperature.

U.S. Pat. No. 4,154,920 features a two-step process starting from a prepolymer having an intrinsic viscosity of 0.1 to 0.3 dl/g, in accordance with which the prepolymer is first condensed in the molten state to form a thin layer and then post-condensed in the solid state.

Finally, according to published French patent application No. 79/12,337, the polyester pellets are post-condensed and stabilized by heating at 180°–220° C. for 2 to 20 hours, in air, thus increasing the intrinsic viscosity to a value of between 0.60 and 0.97 dl/g.

SUMMARY OF THE INVENTION

It has now been determined, and which is one of the underpinnings of the present invention, that the amount of acetaldehyde which is present in the wall members of a molded shaped article and which is capable of migrating, namely, the residual amount present in the granules together with the amount which is reformed during the conversion in the molten state to form the molded article, not only depends on the conditions of treatment of the precursor prepolymer (drying, crystallization and post-condensation), but is related, on the one hand, to the intrinsic properties of the precursor prepolymer obtained in the initial stage of the polycondensation in molten state, and, on the other hand, to the recrystallization characteristics of the polymer during the quenching operation in the molten state.

In fact, the precursor prepolymer must contain the fewest possible number of sites which initiate subsequent degradation, namely, vinyl and carboxyl sites. The intrinsic properties of the resin can be very different for one and the same catalyst system, depending on the conditions of polycondensation. The heat stability of the precursor can be measured indirectly by measuring the rate of reformation of acetaldehyde in the polymer when the latter is heated to a high temperature. Furthermore, the amount of acetaldehyde which is reformed is directly proportional to the processing temperature of the material, and this temperature will be the higher, the faster the rate of recrystallization during quenching.

The present invention thus features an improved poly(ethylene glycol)terephthalate having characteristics which are useful for the injection or blow molding, or extrusion-blowing of transparent articles, and also to a process for the preparation of said polyterephthalate.

Briefly, the poly(ethylene glycol)terephthalate according to this invention, which has an intrinsic viscosity of between 0.65 and 1.05 dl/g and a density of >1.38, consists of 92.5 to 98.5% of ethylene terephthalate recurring units and 1.5 to 7.5 mol % of units of a comonomeric crystallization retardant selected from among one or more of the polybasic acids and/or polyhydric alcohols, the amount of di- and/or triethylene glycol being limited to a value of less than about 3.5% (mols per mol of diacid radicals present in the chain), and is characterized by the following combination of properties:

(1) residual acetaldehyde concentration of less than 1.25 ppm;
(2) rate of reformation of acetaldehyde, at 220° C., of less than 5 ppm/hour; and
(3) absence of visible crystallization in a test plate, having a thickness of at least 4 mm, which is obtained by injecting the molten material, at 280° C., into a mold, the wall members of which are maintained at a temperature of 37° C.

DETAILED DESCRIPTION OF THE INVENTION

More particularly according to this invention, by the term "ethylene terephthalate recurring units" there is also intended that small amount of di- and triethylene glycol terephthalate inevitably formed during the polycondensation.

The preparation of polyesters from aromatic dicarboxylic acids, or their functional derivatives, and from aliphatic diols by direct esterification or by transesterification, followed by polycondensation in the presence of catalysts, is a very well known process. In a first reaction step, the dicarboxylic acid is esterified, or its dimethyl ester is transesterified with glycol. In a second step, the diglycol ester formed is subjected to polycondensation. This yields a polyester of low molecular weight, which will be designated hereafter by the term "precursor," or precursor prepolymer. To obtain polyesters of high molecular weight, the precursor is dried, crystallized and then subjected to post-condensation in solid or molten state until the desired final viscosity is obtained.

For the preparation of the poly(ethylene glycol)-terephthalate according to the invention, such process is characterized in that, for the formation of the precursor prepolymer having an intrinsic viscosity of between 0.55 and 0.70 dl/g, the polycondensation is carried out in the presence of at least one comonomeric, copolymerizable modifier for retarding crystallization, in an amount of between 1.5 and 7.5 mol %, relative to the combination of the diacids or diesters and the retardant used, at a temperature below 290° C., and is limited to a degree of between 75 and 90% of the maximum accessible degree of polycondensation, evaluated according to the intrinsic viscosity of the polymer.

The copolymerizable modifiers for retarding crystallization can be aromatic and/or aliphatic polybasic carboxylic acids and/or polyhydric alcohols. For example, representative such retardants are isophthalic, naphthalenedicarboxylic, adipic and sebacic acids, or their ester-forming derivatives thereof. Exemplary driols are neopentyl glycol, hexane-1,6-diol, bis-1,4-hydroxymethylcyclohexane, diethylene glycol and triethyleneglycol. In the case of di- and/or triethylene glycol, it is essential that the total amount, which can either be added or can result from its formation in situ by the dehydration of the excess ethylene glycol, remains less than 3.5 mol % per mol of diacid radicals present in the chain. The use of very small amounts of trifunctional acidic or alcoholic compounds is possible, insofar as this addition does not increase the rate of crystallization of the polymer.

The particular catalyst system employed can influence the formation of the acetaldehyde. It is inadvisable to use the catalysts in excessive amounts. The use of antimony compounds as polycondensation catalysts, at concentrations below 250 ppm (expressed by weight of metal relative to the weight of all the constituents) has been found to be particularly favorable.

The degree of polycondensation of the precursor depends on factors such as the nature and the proportion of the catalyst system, the performances of the equipment and the temperature and pressure of the polycondensation. This degree of polycondensation can be determined by measuring the intrinsic viscosity of the polymer. Under given operating conditions, there is a maximum polycondensation threshold beyond which the viscosity can no longer be increased, the degradation reactions dominating the polycondensation reaction.

According to one of the essential features of this invention, the intrinsic viscosity of the precursor, $VI_p$, is limited to a value of between 0.75 and 0.90 of the maximum possible viscosity $VI_\infty$, namely, a value reflected by the relationship:

$$0.75 VI_\infty < VI_p < 0.90 VI_\infty.$$

If the viscosity attained is limited to less than 0.75 $VI_\infty$, the process is not a high-performance process. If the polycondensation is continued beyond the value of 0.90 $VI_\infty$, an increase in the rate of reformation of acetaldehyde is observed.

After crystallization and drying of the precursor prepolymer obtained in accordance with the process of the invention, the post-condensation can be carried out by any known process in order to obtain a final intrinsic viscosity of between about 0.65 and 1.05. The post-condensation is preferably carried out in the solid state, under a high vacuum or under an inert gas, at between 190° and 230° C., for a period which can vary from 5 to 25 hours. The product obtained can be converted to chips, granules or pellets by any known means.

The polyterephthalates obtained according to the invention can be molded by any process to form containers/packages/bottles. They can be molded by injection molding, blow molding, extrusion, injection-blowing or extrusion-blowing, either directly to give a finished product or shaped article or indirectly to provide a tube or preform, which will subsequently be molded to the desired shape of the container.

By virtue of reduced rates of recrystallization during quenching, the subject polyesters make it possible to mold transparent articles having relatively thick walls, such as preforms for bottles, with minimum degradation of the resin. Same are particularly valuable for the production of bottles intended for the packaging of mineral water, which can be stored for a prolonged period of time without the taste being substantially impaired.

In order to further illustrate the present invention and the advantages thereof, the following specific examples are given, it being understood that same are intended only as illustrative and in nowise limitative.

The following measurements and determinations were used to characterize the product obtained according to the invention.

[1] Residual acetaldehyde content: residual AA. The sample, cooled in liquid nitrogen, was ground to a fine powder having a particle size of less than 800 microns. The powder was heated for 1 hour, 30 minutes at 160° C. in a closed flask, under nitrogen, and the amount of acetaldehyde released or evolved was determined by vapor phase chromatography (VPC).

[2] Rate of reformation of acetaldehyde at 220° C.: this measurement was carried out on the powder ground as above. The powder was heated for 30 minutes at 220° C. to remove the residual acetaldehyde initially present. The flask was purged with nitrogen and closed. A sample of gas was taken after heating for 1, 2 and 3 hours and the acetaldehyde was determined in each sample by VPC. The total amount was divided by the time (3 hours) to give the number of parts by weight of acetaldehyde per million parts by weight of polyester per hour.

[3] Intrinsic viscosity VI in dl/g: this measurement was carried out at 25° C. in a 1% strength (weight/volume) solution in a 47/53 mixture of phenol/orthochlorophenol.

[4] Crystallization: the dry polymer was plasticized at 290° C. such as to destroy any crystallization nucleus. The molten product was injected into a series of molds of progressively varying thickness in order to obtain test plates having a thickness of between 2 and 5 mm. The temperature of the walls of the mold was conditioned at 37° C. The thickness e at which a slight turbidity appeared, corresponding to the commencement of crystallization, was noted. The higher the thickness e of the totally transparent, amorphous moldings, the slower the rate of recrystallization.

[5] Diethylene glycol concentration (DEG%): the sample was ground and saponified by potassium hydroxide in ethanolic solution. Analysis was carried out by gas chromatography in the presence of an internal standard. The results are expressed in mols, relative to the diacid radicals.

EXAMPLE 1

A precursor was prepared by the transesterification of a mixture of dimethyl terephthalate/ethylene glycol and polycondensation thereof in the presence of 3% of isophthalic acid (in mols). A catalyst system based on manganese, phosphorus and antimony, containing 200 ppm of antimony, was used.

The polycondensation was terminated when the intrinsic viscosity of the precursor, $VI_p$, attained a value of 0.61 dl/g, it being possible for the limiting viscosity $VI_\infty$ to be brought to a value of 0.72 dl/g. After drying and crystallization, the granules were subjected to post-condensation in the solid state under 66.66 Pa, for 12 hours, at 217° C., in order to obtain a VI of 0.81 dl/g.
 (i) Residual AA: 0.9 ppm
 (ii) Reformation of AA at 220° C.: 4 ppm/hour
 (iii) e of amorphous molding: 5 mm
 (iv) DEG%: 1.4

EXAMPLE 2

Example 1 was repeated, except that 2% of isophthalic acid was added.

The polycondensation was terminated at a $VI_p$ value of 0.65 dl/g. The $VI_\infty$ was 0.75 dl/g.

After post-condensation in the solid state until a VI of 0.81 dl/g was obtained, the granules possessed the following characteristics:
 (i) Residual AA: 1.2 ppm
 (ii) Reformation of AA at 220° C.: 4.6 ppm/hour
 (iii) e of amorphous molding: 4.5 mm
 (iv) DEG%: 1.6

COMPARATIVE EXAMPLES:

EXAMPLE 3

A homopolymer was prepared by the transesterification of dimethyl terephthalate and ethylene glycol and then polycondensation thereof using the same catalyst system as in the preceding example. The polycondensation was terminated at a $VI_p$ value of 0.60, the $VI_\infty$ being 0.72. The precursor was treated under the conditions of Example 1 until a final viscosity of 0.75 dl/g was obtained. The following characteristics were obtained:
 (i) Residual AA: 1.1 ppm
 (ii) Reformation of AA at 220° C.: 4.2 ppm/hour
 (iii) e of amorphous molding: 3 mm
 (iv) DEG%: 1.3

EXAMPLE 4

The procedure of Example 1 was repeated (addition of 3% of isophthalic acid), but the viscosity $VI_p$ was increased to the maximum possible value, namely, 0.72. After post-condensation under the same conditions, the following results were obtained:
 (i) Residual AA: 3 ppm
 (ii) Reformation of AA at 220° C.: 20 ppm/hour
 (iii) e of amorphous molding: 5 mm

EXAMPLE 5

Example 1 was repeated, 4 mol% of diethylene glycol being added to the reaction products. The polycondensation was terminated at a $VI_p$ value of 0.60 dl/g; $VI_\infty$ is 0.70 dl/g. After drying, crystallization and post-condensation under the conditions described, the following results were obtained:
 (i) Residual AA: 1.9 ppm
 (ii) Reformation of AA at 220° C.: 9 ppm/hour
 (iii) e of amorphous molding: 4.5 mm
 (iv) DEG%: 3.72

The polyesters obtained in accordance with Examples 1 to 5 were used for the manufacture of biaxially oriented bottles.

For this purpose, the granules were dried to a moisture content of less than 50 ppm and injected in the molten state, with the aid of an injection-molding press, into a preform mold with hot channels, such as to obtain amorphous preforms weighing 47 g and having a wall thickness of 3.8 mm. The acetaldehyde concentration was measured on a sample taken from the wall of the preform. For each of the experiments, the injection temperature of the material and the % of AA measured on the preform (weight/weight of polyester) were noted.

TABLE I

| Example | T° of injection in °C. | AA in ppm |
|---|---|---|
| 1 | 285 | 3.5 |
| 2 | 290 | 4.5 |
| 3 | 310 | 8 |

TABLE I-continued

| Example | T° of injection in °C. | AA in ppm |
|---|---|---|
| 4 | 285 | 6 |
| 5 | 300 | 9.1 |

The preforms were blown at biaxial orientation temperature to shape bottles having a capacity of 1.5 liters. The bottles were filled with aerated mineral water and stored at 45° C. In the case of the bottle obtained from the polyterephthalate according to Examples 1 and 2, an organoleptic test carried out by comparison with a mineral water stored in a glass bottle does not reveal any modification of the taste, which may result from migration of the acetaldehyde, after storage for one month. In all the other cases, a substantial impairment of taste was detected after storage for 8 days or more, which made the mineral water unsuitable for consumption.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A poly(ethylene glycol)terephthalate (PET) having an intrinsic viscosity ranging from 0.65 to 1.05 dl/g and a density of more than 1.38, comprising 92.5 to 98.5% of ethylene terephthalate recurring units and 1.5 to 7.5 mol % of recurring units of at least one polybasic acid and/or polyhydric alcohol comonomeric crystallization retardant, the di- and/or triethylene glycol content thereof being less than about 3.5 mol % per mol of diacid radicals present in the polymer chain, said PET also having a residual acetaldehyde concentration of less than 1.25 ppm, with acetaldehyde being reformed therefrom at a rate of less than 5 ppm/hour, at 220° C., and said PET being devoid of visible crystallization in an at least 4 mm thick test plate shaped in a mold cavity from a melt thereof.

2. The poly(ethylene glycol)terephthalate as defined by claim 1, said melt having a temperature on the order of 280° C., and said shaping being by injection molding into a mold cavity, the wall members of which being maintained at a temperature on the order of 37° C.

3. The poly(ethylene glycol)terephthalate as defined by claim 1, said comonomeric crystallization retardant comprising isophthalic, naphthalenedicarboxylic, adipic and/or sebacic acid, and/or ester-forming derivative thereof, and/or neopentyl glycol, hexane-1,6-diol, bis-1,4-hydroxymethylcyclohexane, diethylene glycol and/or triethylene glycol.

4. The poly(ethylene glycol)terephthalate as defined by claim 1, said comonomeric crystallization retardant comprising isophthalic acid.

5. A process for the preparation of the poly(ethylene glycol)terephthalate as defined by claim 1, comprising esterification or transesterification of terephthalic acid, or ester-forming derivative thereof, with ethylene glycol; next catalytic polycondensation until a precursor prepolymer results; and thence post-condensation of the precursor prepolymer to an intrinsic viscosity ranging from 0.65 to 1.05 dl/g; and wherein the precursor prepolymer is polycondensed to an intrinsic viscosity ranging from about 0.55 to about 0.70 gl/g by carrying out said polycondensation in the presence of at least one comonomeric crystallization retardant, in an amount of between 1.5 and 7.5 mol % and at a temperature below 290° C., said polycondensation being to a value of intrinsic viscosity ranging from 75 to 90% of the maximum intrinsic viscosity obtainable.

6. The process as defined by claim 5, said comonomeric crystallization retardant comprising isophthalic, naphthalenedicarboxylic, adipic and/or sebacic acid, and/or ester-forming derivative thereof, and/or neopentyl glycol, hexane-1,6-diol, bis-1,4-hydroxymethylcyclohexane, diethylene glycol and/or triethylene glycol.

7. The process as defined by claim 1, said comonomeric crystallization retardant comprising isophthalic acid.

8. The process as defined by claim 5, said polycondensation being carried out in the presence of at least 250 ppm of an antimony polycondensation catalyst.

9. A molded shaped article comprised of the poly(ethylene glycol)terephthalate as defined by claim 1.

10. The molded shaped article as defined by claim 9, the same being biaxially oriented.

11. The molded shaped article as defined by claims 9 or 10, comprising a foodstuff/beverage packaging material.

12. The molded shaped article as defined by claim 11, the same being a bottle.

13. The molded shaped article as defined by claim 12, said bottle containing a mineral water.

14. The molded shaped article as defined by claim 13, said mineral water being aerated.

15. The molded shaped article as defined by claim 11, the same being transparent, bright and devoid of crystalline spherulites.

* * * * *

REEXAMINATION CERTIFICATE (3676th)

United States Patent [19]

Bonnebat et al.

[11] B1 4,340,721

[45] Certificate Issued Dec. 1, 1998

[54] POLYESTERS FOR THE PACKAGING OF COMESTIBLES

[75] Inventors: Claude Bonnebat, Pontault Combault; Gilbert Roullett, Clamecy; Yves Vaginay, Corbas, all of France

[73] Assignee: Rhone-Poulenc Industries, Paris, France

Reexamination Request:
No. 90/004,877, Dec. 22, 1997

Reexamination Certificate for:
Patent No.: 4,340,721
Issued: Jul. 20, 1982
Appl. No.: 265,335
Filed: May 19, 1981

[30] Foreign Application Priority Data

May 20, 1980 [FR] France ................. 80 11201

[51] Int. Cl.[6] .................................... C08G 63/02
[52] U.S. Cl. .............. 528/272; 528/274; 528/285; 528/302; 528/307; 528/308.6; 428/35.7; 428/35.8; 428/36.92
[58] Field of Search ................. 528/272, 274, 528/285, 302, 307, 308.6; 428/35.7, 35.8, 36.92

[56] References Cited

U.S. PATENT DOCUMENTS 4,080,317  3/1978  Morawetz et al. ................. 525/437

4,340,721  7/1982  Bonnebat et al. ................. 528/272

OTHER PUBLICATIONS

Celanese Plastics & Specialty Company, Schaul, *Drying An Injection Molding PET For Beverage Bottle Preforms*, Soc. Plast. Eng. Tech., Pap., Annual Technical Conference, New York, New York, May 5–8, 1980, pp. 534–536.

*Primary Examiner*—Sam A. Acquah

[57] ABSTRACT

Novel polyester for the packaging of perishable comestibles, e.g., as bottles for still or carbonated mineral waters, is a poly(ethylene glycol)terephthalate (PET) having an intrinsic viscosity ranging from 0.65 to 1.05 dl/g and a density of more than 1.38, comprising 92.5 to 98.5% of ethylene terephthalate recurring units and 1.5 to 7.5 mol % of recurring units of at least one polybasic acid and/or polyhydric alcohol comonomeric crystallization retardant, the di- and/or triethylene glycol content thereof being less than about 3.5 mol % per mol of diacid radicals present in the polymer chain, said PET also having a residual acetaldehyde concentration of less than 1.25 ppm, with acetaldehyde being reformed therefrom at a rate of less than 5 ppm/hour, at 220° C., and said PET being devoid of visible crystallization in an at least 4 mm thick test plate shaped in a mold cavity from a melt thereof.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-15 is confirmed.

* * * * *